United States Patent [19]

Binns

[11] Patent Number: 4,815,906

[45] Date of Patent: Mar. 28, 1989

[54] BLIND RIVET ASSEMBLY

[76] Inventor: Lloyd S. Binns, 1349 Oakheath Dr., Harbor City, Calif. 90710

[21] Appl. No.: 24,736

[22] Filed: Mar. 10, 1987

[51] Int. Cl.$^4$ .............................................. F16B 13/04
[52] U.S. Cl. ....................................... 411/38; 411/43; 411/69; 411/902
[58] Field of Search ..................................... 411/34–38, 411/43, 69, 70, 360, 901, 902, 903; 403/224

[56] References Cited

U.S. PATENT DOCUMENTS

| | | | |
|---|---|---|---|
| 4,312,613 | 1/1982 | Binns | 411/34 |
| 4,364,697 | 12/1982 | Binns | 411/43 |
| 4,405,256 | 9/1983 | King, Jr. | 411/69 |
| 4,627,775 | 12/1986 | Dixon | 411/43 |

Primary Examiner—Neill R. Wilson
Attorney, Agent, or Firm—Leonard Tachner

[57] ABSTRACT

A blind rivet assembly is disclosed. The rivet assembly comprises a mandrel, a rivet body, a buckle sleeve, an expanding wrinkle sleeve, a pressure sleeve and a locking collar. The sleeves, rivet body and collar are slideably disposed about the mandrel with said buckle sleeve disposed adjacent one end of the body, and the mandrel extending through the body and beyond the other end thereof. The buckle sleeve has a generally cylindrical configuration such that when subjected to a pulling force, the sleeve buckles outwardly from the mandrel, slides about the rivet body and engages a workpiece. The wrinkle sleeve has a generally cylindrical, but longitudinally corrugated configuration, such that as the mandrel proceeds through the rivet body, the wrinkle sleeve expands radially and helps create an interference fit between the rivet body and an opening in the workpiece.

14 Claims, 4 Drawing Sheets

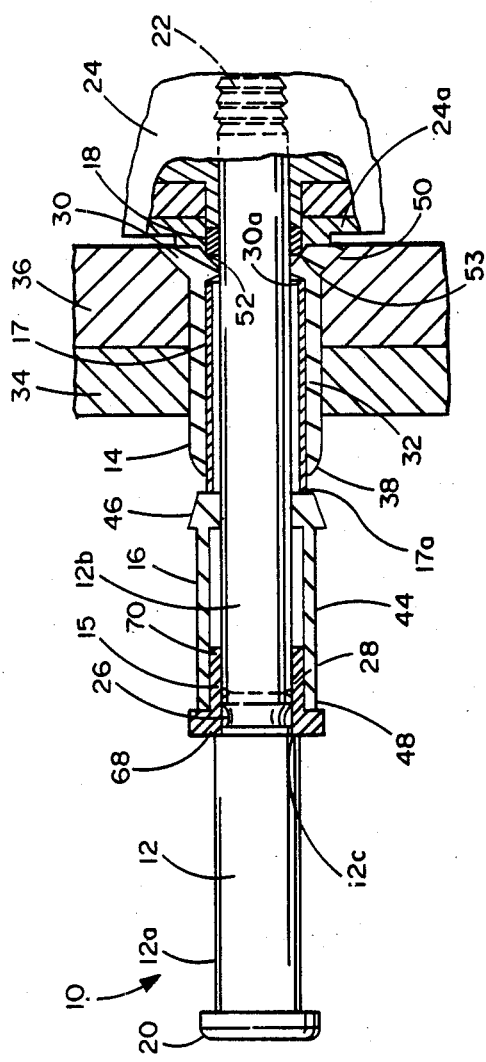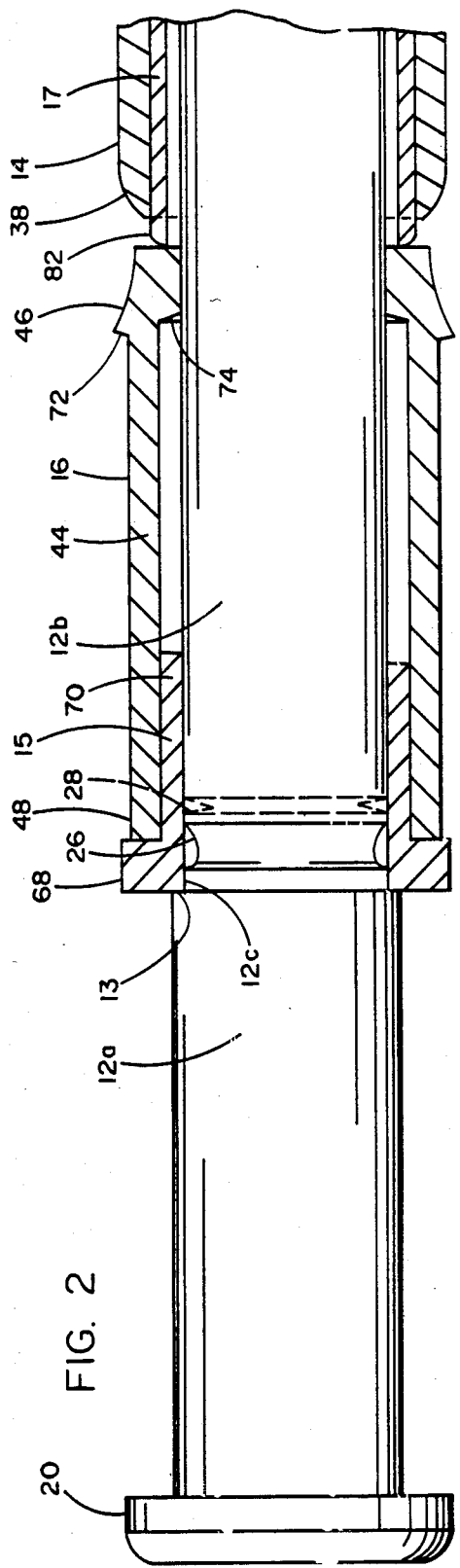
FIG. 1
FIG. 2

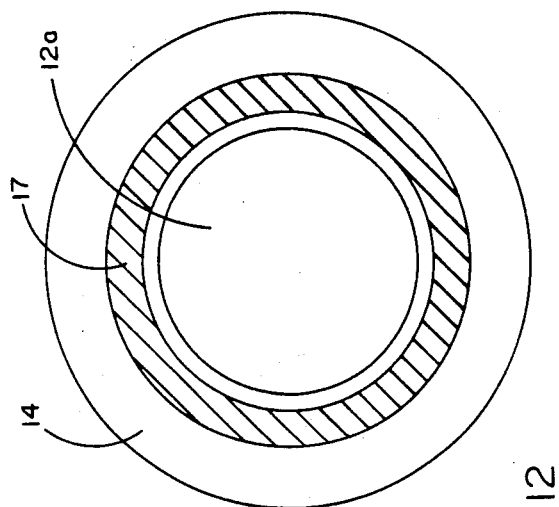
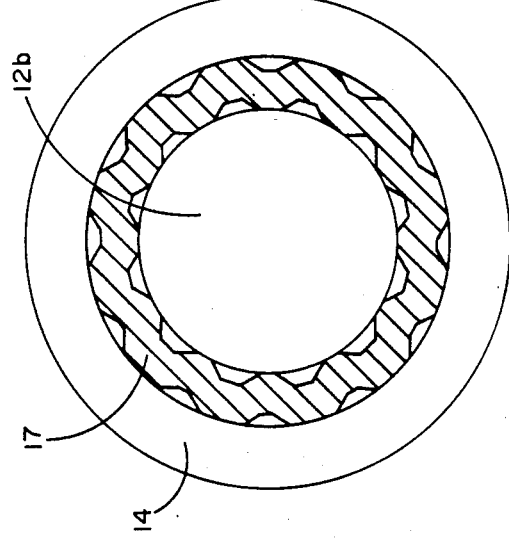
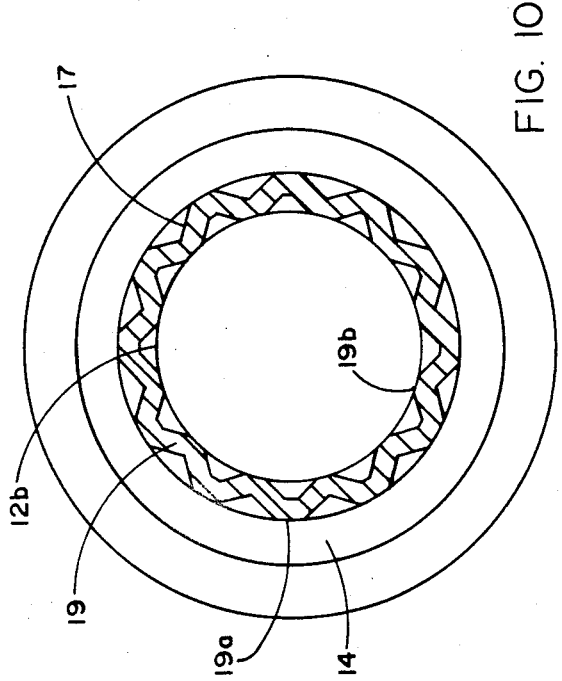
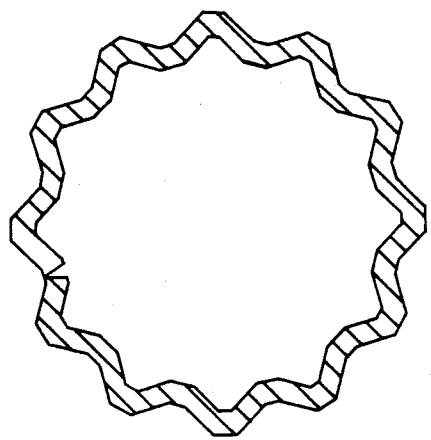
FIG. 13
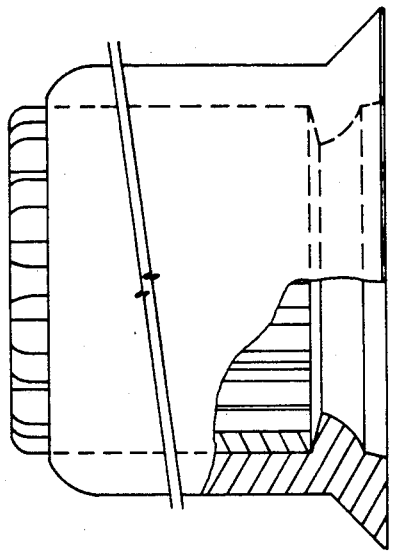
FIG. 11

BLIND RIVET ASSEMBLY

BACKGROUND OF THE INVENTION

1. Field of the Invention

The present invention relates to blind rivets having an internally located deformable sleeve section.

2. Prior Art

Blind rivets are well-known in the art and are used to fasten components when only one side of the workpiece is accessible. Such rivets generally comprise three pieces: (a) a stem or mandrel having a bulb-forming head at one end and serrations at the other end for engagement by a pulling tool; (b) a tubular body surrounding the mandrel and having a flanged head; and (c) a locking collar engaging the mandrel near the body head. In use, the head portion of the mandrel and the surrounding body together are inserted through a hole in the workpiece. A riveting tool including a pulling head is used to translate the mandrel axially away from the workpiece. During such translation, the bulb-forming elements of the mandrel expand the rivet body laterally to form a "blind bulb" on the hidden side of the workpiece. The pulling head then forces the locking collar into a groove in the mandrel to lock the headed, accessible end of the body to the stem. Finally, the stem portion of the mandrel extending from the workpiece is broken off to complete the installation.

One advance over such prior art blind rivet is disclosed in my U.S. Pat. No. 4,312,613, the disclosure of which is herein incorporated by reference. In that patent, a rivet assembly is disclosed comprising a mandrel, a rivet body, a buckling sleeve and a locking collar. The sleeve, rivet body and collar slideably disposed about the mandrel with the buckle sleeve disposed adjacent one end of the body and the mandrel extending through the body and beyond the other end of the body. The buckle sleeve has a generally cylindrical configuration such that when subjected to a pulling force, the sleeve buckles outwardly from the mandrel, slides about the rivet body and engages the workpiece. While such blind rivet assembly does contain a number of advantages over the prior art, yet further improvements are needed in order to keep pace with the development of new structural materials and the desires of the marketplace.

SUMMARY OF THE INVENTION

The present invention provides a number of advantages over the prior art. By use of a specifically configured buckle sleeve, a "foot" of predetermined larger area is preformed which makes a more advantageous footprint on the workpiece and thus reduces the possibility that the workpiece will be damaged. Further, the present invention includes a wrinkle sleeve which permits an expansion of the rivet body to fill the opening extending through the workpiece. Yet further advantages of the present blind rivet assembly relate to the fact that the assembly can be easily made, and does not require many complex steps associated with prior art designs.

In the past, prior art assemblies comprise three components. The rivet assembly of the present invention comprises five and preferrably six components. However, the design of these components is such that the entire assembly lends itself to straight-forward manufacturing techniques. This helps reduce the cost of the final assembly. Further, the design is such that high reliability is achieved. This is especially important as rivet assemblies are often used in high stress aircraft manufacture.

The blind rivet assembly of the present invention comprises a mandrel having a head at one end, a buckle sleeve, a rivet body, a separate locking collar, a separate wrinkle sleeve, and a pressure sleeve. The mandrel has a larger diameter portion adjacent the head, with a right angled shoulder to a smaller diameter portion. The buckle sleeve is designed such that when a strong axial force is exerted on the end of the mandrel so as to put it under compression, the buckle sleeve buckles outward at a specific location around the mandrel to form a flange. By the use of the specific configuration of the buckle sleeve of the present invention, an annular flange is obtained having certain, predetermined configuration with a large, flat, workpiece engaging surface referred to as a "foot". In a preferred embodiment, the buckle sleeve of the invention is uniquely configured to be a cold-formed part instead of a machined part. This results in a significant reduction in cost of manufacture as compared to the more complex shape of the buckle sleeve in my earlier Patent.

The expandable, wrinkle sleeve represents another improvement over the prior art. This sleeve permits a severe interference fit with the hole in the workpiece throughout the entire thickness of the structure in a relatively simple and straight-forward manner. Prior art rivet assemblies achieved severe interference fit over selected segments of a structure and mainly on the blind side, the cumulative effect of several such rivets causing the structure to warp or bow. The completeness and uniform severity of interference produced by the present invention causes no non-uniform structural warpage. The assembly of the present invention so completely fills the hole that the flow of fluid through the hole is substantially precluded. The rivet body and wrinkle sleeve are designed so as to provide a tail section which aids in controlling the buckling of the buckle sleeve member. The tail section is configured so as to minimize problems due to eccentricity of the bores in the buckle sleeve and the rivet body, and to assure a fully developed primary buckling of the buckle sleeve prior to any contact with the workpiece.

The present invention also has a pressure sleeve. This sleeve temporarily rests against a shoulder on the mandrel not far from to the head end of the mandrel. The pressure sleeve encourages hole proper formation of the blind head on the buckle sleeve. In effect, the pressure sleeve acts as a temporary head on the mandrel, and enables the assembly of the present invention to perform in a similar, but superior manner to the assembly disclosed in U.S. Pat. No. 4,312,613.

The new combination of pressure sleeve and wrinkle sleeve also provides a further significant improvement in performance. More specifically, an annular portion of the wrinkle sleeve beyond the blind side of the workpiece expands beyond hole diameter to lock the body member to the workpiece thereby increasing the reliability of the rivet.

Another advance over prior art is also cited in my U.S. Pat. No. 4,089,249 and is referenced herein. In that patent which relates the typical cooperative functions of mandrel, rivet body and locking collar, benfits of a plurality of longitudinal ribs defining "crests and troughs" on the internal bore of the rivet body are explained. The purpose is to achieve rivet body expansion during installation as the the mandrel works the material in the "crests" such as the "troughs" stand ready to accept lateral displacement of excessive material. Other designs that attempt to work the smooth wall of the internal bore of a body member without "crests and troughs", produce axial elongation of the body member eventually forcing the manufactured head of the body to stand off (head rise), the workpiece thus loosening the joint. The two-piece construction of the disclosed body, fitted with a wrinkle sleeve within its internal bore, provides for progressive lateral release of displaced material.

The other components of the present invention and yet other advantages are discussed below.

The novel features which are believed to be characteristic of this invention, both as to its organization and method of operation, together with further objective and advantages thereof will be better understood from the detailed description considered in connection with the drawings in which a presently preferred embodiment of the invention is illustrated by way of example. It is to be expressly understood, however, that the drawings are for the purpose of illustration and description only, and are not intended as a definition of the limits of the invention.

OBJECTS OF THE INVENTION

It is therefore a principal object of the present invention to provide an improved blind rivet assembly having superior performance characteristics and yet having a more easily fabricated buckle sleeve.

It is another object of the present invention to provide an improved blind rivet assembly having specific advantageous improvements as compared to my prior U.S. Pat. No. 4,312,613 including the formation of a larger, more predictable workpiece contacting foot, the formation of additional workpiece securing engagement, a hole filling interference fit using an easily fabricated wrinkle sleeve and a more readily fabricated buckle sleeve.

It is still another object of the present invention to provide a pressure sleeve with an annular flange at one end of a short hollow cylinder the purpose of which is to control and stop excessive axial deformation of the buckle sleeve which is initially compressed between the annular flange of the pressure sleeve and the tail end of the wrinkle sleeve. Compression however, relaxes once the resulting blind head slides off the wrinkle sleeve end and around the shank end of the body member. Upon engaging the workpiece, sleeve compression and deformation resume only to be stopped permanently when the pressure sleeve's cylindrical formed end abuts the tail of the wrinkle sleeve.

It is stil another object of the present invention to provide an improved blind rivet assembly having a uniquely configured elongated mandrel which, in combination with both a buckle sleeve and a wrinkle sleeve, permits buckle formation and hole filling for increased fastening reliability and performance.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which:

FIG. 1 is a cross-sectional view showing one embodiment of the blind fastener assembly of the present invention;

FIG. 2 is an enlarged view of the rear end portion of the invention in the configuration of FIG. 1;

FIG. 10 is a cross-sectional view taken along lines 10—10 of FIG. 6 and showing the configuration of the wrinkle sleeve;

FIG. 11 is a partially cut-away view of the rivet body and wrinkle sleeve;

FIG. 12 is a schematic illustration of the wrinkle sleeve shown both before and after hole filling;

FIG. 13 is a detailed geometrical illustration of the structure of an embodiment of the wrinkle sleeve.

DETAILED DESCRIPTION OF THE INVENTION

Figure 5:
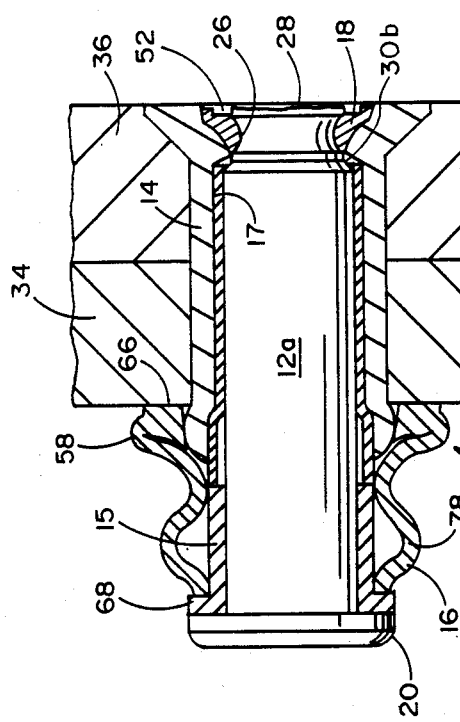
FIG. 5 shows the embodiment of FIG. 1 in a fully extended position.

Referring initially to FIGS. 1–5, the first embodiment of the improved blind fastener assembly of the present invention is shown. The fastener assembly 10 includes a solid rod-shaped stem or mandrel 12, a tubular rivet body 14, a buckle sleeve 16 with the sleeve 16 at the one end of body 14 and a locking collar 18 at the other end thereof. In the preferred embodiment, the assembly 10 also includes a pressure sleeve 15 extending out of the sleeve 16, and a wrinkle sleeve 17 disposed axially within rivet body 14.

The mandrel 12 has an enlarged or flared manufactured stem head or shoulder 20 at one end thereof disposed on a first rearward end portion 12a. Portion 12a is configured to circumferentially engage sleeve 16, and more specifically, pressure sleeve 15. In the preferred embodiment, the outside diameter of mandrel portion 12a is slightly larger than the internal diameter of sleeve 15. This size relationship is seen best in FIG. 2. A plurality of pulling members 22, shown in phantom line in FIG. 1, are located adjacent a second forward end portion 12b of mandrel 12. Pulling members 22 are configured to be engaged by an associated pulling tool 24 such as that illustrated and described in U.S. Pat. No. 3,915,055. It is to be understood, however, that a wide variety of pulling members and associated pulling tools are readily used with the present invention. Mandrel 12 also has an inwardly extending groove 26 of reduced cross-sectional diameter, compared with portions 12a and 12b into which the locking collar 18 is forced as hereinbelow described. Adjacent the groove 26 is a break notch section 28 which is configured such that portion 12b of the mandrel can be separated from portion 12a as hereinbelow described.

Rivet body 14 has a generally tubular configuration and includes an enlarged head 30 adjacent one end thereof, an intermediate shank portion 32 and an arched, domed tail section 38 adjacent the other end thereof. In the preferred embodiment, the shank portion 32 extends through aligned openings in a pair of workpieces 34 and 36. Rivet body 14 has been bored out so as to axially accommodate wrinkle sleeve 17 along the length thereof. Angular shoulder 30a defining an opening 30b (FIG. 6) is produced adjacent head section 30. Shoulder 30a helps retain sleeve 17 in place. Other means for retaining sleeve 17 in body 14 are also within the scope of this invention.

The buckle sleeve 16 also has a generally tubular configuration and includes a central thin walled intermediate section 44, a first thicker end 46 and a second end 48. In the preferred embodiment, sections 44 and 48 have the same approximate thickness. Buckle sleeve 16 is configured to form external and internal shoulder areas 72 and 74, respectively, adjacent end 46. While not to be limited to any specific method of construction, the internal ledge or shoulder 74 of section 46 can be made by boring out the sleeve 16 such that the inner diameter of sleeve 16 is smaller adjacent the rivet body 14, than adjacent the stem head 20. Note that end 46 of sleeve 16 abuts directly against a tail section 17a of the wrinkle sleeve 17 in an end-to-end configuration.

Reference is now made to pressure sleeve 15 which is disposed adjacent end 48 of the buckle sleeve 16. Sleeve 15 has an outside collar or shoulder flange 68 which is disposed over and abuts against end 48 of buckle sleeve 16. As can also be seen, sleeve 15 includes a tubular section 70 which extends axially into and matingly engages the internal wall of buckle sleeve 16 and the external wall of portion 12b of the mandrel 12. Flange 68 compresses stem portion 12c formed between the larger diameter and smaller diameter portions 12a and 12b, respectively, and extending forward of a right angled portion 13.

As noted above, the expandable wrinkle sleeve 17 is located axially within rivet body 14. Sleeve 17 includes an arcuate dome 82 (see FIG. 2) upon which the end 46 of the buckle sleeve 17 rests. In the preferred embodiment, sleeve 17 has a series of corrugated or ridge and valley sections 19 which extend axially along the length thereof as illustrated in FIGS. 10 and 13. Sections 19 define a series of outwardly extending convolutions 19a which engage the inner wall of rivet body 14 and a series of inwardly extending convolutions 19b. The internal diameter of the convolutions 19b permits mandrel portion 12b of mandrel 12 to readily pass therethrough, but is selected so as to engage mandrel portion 12a. Thus, deformation of the sleeve 17 occurs as portion 12a of mandrel 12 translates through rivet body 14.

The wrinkle sleeve 17 and its relation to rivet body 14 may be best understood by referring to FIGS. 10–13. FIGS. 10 and 11 illustrate the wrinkle sleeve in its still corrugated configuration before inner and outer covolutions 19b and 19a, respectively, have been smoothed out by the radial force of stem portions 12a of mandrel 12. FIG. 12 illustrates the "before" and "after" configurations of the wrinkle sleeve and FIG. 13 illustrates a preferred, low-cost, embodiment of the wrinkle sleeve. The wrinkle sleeve of FIG. 13 may be constructed from a thin walled regular cylinder that has been deformed so that its wall takes on a corrugated form, or it may be rolled from flat stock into a cylinder whose wall is split axially at its abutting surfaces as seen in FIG. 13. At least one axial end of the regular cylinder or flat stock may be shaped to form an end dome radius to facilitate proper buckling of buckle sleeve 16.

To install the blind fastener assembly 10 of the present invention in a pair of workpieces 34 and 36, a hole is drilled through the workpieces 34 and 36. Workpiece 36 is countersunk at area 50. Assembly 10 is then inserted as shown in FIG. 1. The hole through the workpieces 34 and 36 is large enough to permit stem head 20 of the mandrel 12 as well as the pressure sleeve 15 and buckle sleeve 16 to pass through. The rivet body 14 also passes through the opening, but is retained by the enlarged head 30 which engages the counter sunk area 50 in workpiece 36. Alternatively, for protruding head style rivets, the countersink may be unnecessary. Other means for eliminating the travel of assembly 10 through the workpiece are also within the scope of this invention.

An axial force is exerted on mandrel 12 by means of pulling tool 24. More specifically, the pulling toll 24 engages the pulling member 22, as illustrated and described in U.S. Pat. No. 3,915,055, for example. This technique and associated tool are conventional and need not be described in detail herein. As one can see, however, a region 24a of the pulling tool 24 bears upon the enlarged head 30 of the rivet body 14 and serves to contain the locking collar 18 which bears the reaction force transmitted through the tool anvil during pulling of the mandrel 12. The cylindrical anvil within the toll 24 transmits the axial reaction force on locking collar 18, thus forcing it against a tapered surface 53 and into a recess or cavity 52 of the rivet body 14.

Figure 3:
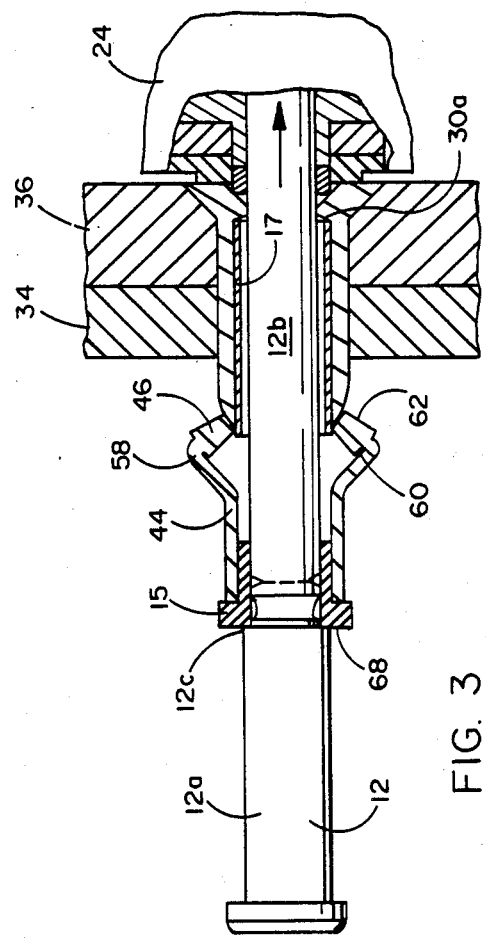
FIG. 3 shows the embodiment of FIG. 1 in a first intermediate position.
Figure 9:
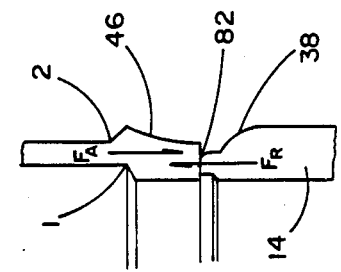
FIG. 9 is a force diagram of the offset forces which produce the desired buckle effect.

As mandrel 12 is advanced by pulling tool 24, end 46 of the buckle sleeve 16 presses against dome section 82 of wrinkle sleeve 17. Further advancement of the mandrel 12 through the workpieces 34 and 36 as shown in FIG. 3, causes an outward buckling of the buckle sleeve 16 to occur adjacent the first end section 46 thus forming a first outwardly extending annular shaped buckle 58. The action of offset forces and a resulting moment at a pivot point at the intersection of sections 46 and 44, encourage buckling. FIG. 9 illustrates the offset axial forces $F_A$ and $F_R$. These forces produce a moment of rotation at point 1 when the buckle sleeve 16 is subject to axial compression and the shoulder at point 2 predetermines the radial extent of the "foot" against workpiece 34. This buckling is also encouraged by the difference in thickness between section 46 and section 44 and by the slight exterior curvature of section 46. Thus, a buckle 58 is formed adjacent a shoulder 60 as seen in FIG. 3. Note that buckle 58 is formed of the entire length of the thicker end section 46 and a roughly equal length increment of the thinner walled section 44.

Figure 4:
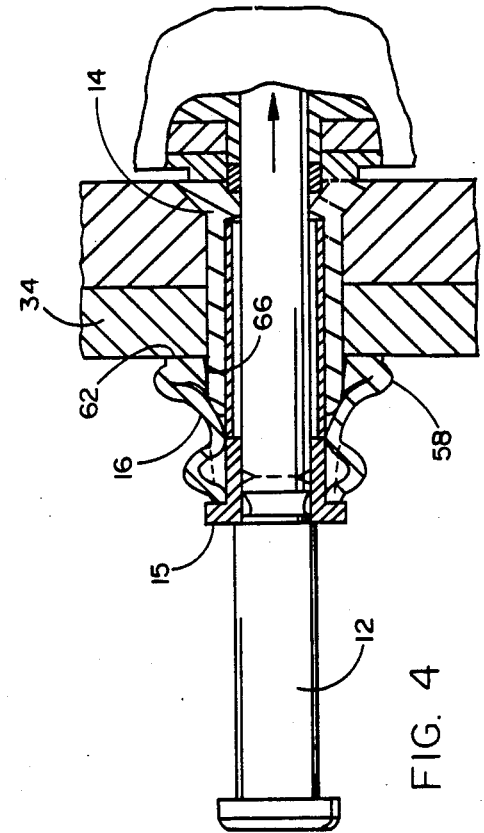
FIG. 4 shows the embodiment of FIG. 1 in an extended position.

Continued advancement of the mandrel 12 through the body 14, as shown in FIG. 4, causes the buckle 58 to flex further axially outward from the mandrel 12 so as to form a generally flat surface or "foot" 62 and to then slide outwardly over and along the rivet body 14 thereby engaging workpiece 34. In this manner, generally flat surface 62 contacts the workpiece 34. Because of this flat foot 62, problems of point pressure associated with prior art buckle sleeves are substantially eliminated. This means that materials such as ceramics, plastics, as well as metals and laminated composites can be used as workpieces 34 and 36.

Referring now to FIGS. 4 and 5, after the initial buckle 58 contacts the workpiece, ruptures shoulder 13 on the mandrel or pressure sleeve portion hugging 12c so that mandrel portion 12a passes successively through the pressure sleeve 15 and the continued advancement of the mandrel 12 through the pressure sleeve 15 and the pressure sleeve 15 and the workpieces 34 and 36 causes portion 12a to proceed through wrinkle sleeve 17. More specifically, portion 12a proceeds through sleeve 17 expanding the inwardly extending convolutions 19b. This radially outward expansion of sleeve 17 causes rivet body 14 to compress the wall of the cavity in workpieces 34 and 36. In this manner interference fit is achieved.

As illustrated in FIG. 5, instead—demonstrating maximum grip thickness of the workpiece, a second buckle 78 will have been formed on buckle sleeve 16 adjacent the head 20. This second outward buckle 78 is yet a further means for accommodating the retention of the workpieces 34 and 36 together for thicker workpiece dimensions. With pressure sleeve 15 abutting the wrinkle sleeve 17 over-folding of the buckle sleeve 16 is rendered impossible or unlikely.

Once the mandrel 12 has been pulled through the workpiece 34 and 36, the flange 68 abuts against stem head 20 simultaneously as lock groove 26 comes into alignment with cavity 52 and the collar 18 is stuffed therein as noted above. After the collar 18 is stuffed into cavity 52, the travel of mandrel 12 is limited and further extraction of mandrel 12 causes portion 12b to break off at notch 28.

As seen in FIG. 5, by the use of the assembly 10 of the present invention, a very stable, final configuration results and produces a symmetrical and unusually large blind head 76 with greater distribution of pressure on the workpiece 34 and joint integrity because of interference fit.

Bore eccentricity may cause the processes of rotation, pivoting and sliding during formation of buckle 58 to develop at non-uniform rates around the periphery of the mating end of the buckle sleeve 16 with different rates of slide being the most problematic of the three processes. To control the slide problem, a stepped form is created adjacent the tail end of rivet body 14. More specifically, the two domes or arcs 38 and 82 are formed on the rivet body 14 and wrinkle sleeve 17, respectively. These are similar in their operation to the domes used in the rivet assembly set forth in U.S. Pat. No. 4,312,613. This step insures that portions of the buckle sleeve 16 adjacent section 46 do not exhibit early slide over body 14 until the other lagging portions of section 44 catch up. Thus, the slide of sleeve 16 is temporarily stopped while the two other processes, rotation and pivoting, continue until the buckling wall of the buckling sleeve 16 rotates through an angle of about 90 degrees as shown in FIG. 4.

When the resulting symmetry obtained by the delay of slide is completed, the slide process is resumed in a uniform manner until the broad face or surface 62 of the blind head 76 makes contact with the workpiece at area 66 as shown in FIG. 5.

Figure 7:
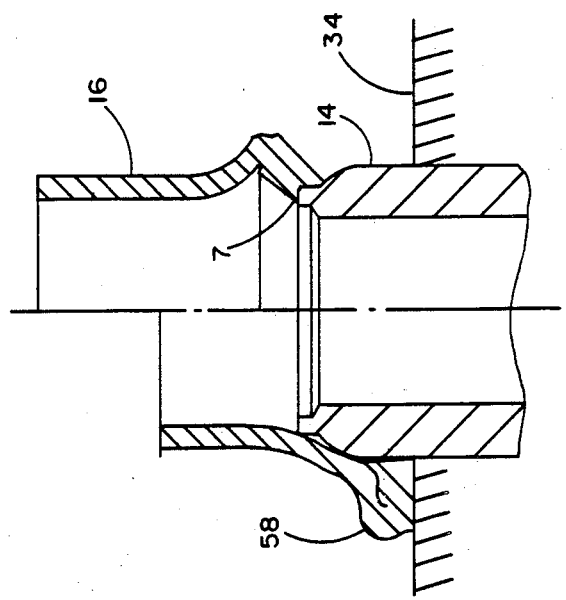
FIG. 7 is an enlarged split cross-sectional view illustrating two stages of buckle formation.

As seen best on the right side of FIG. 7, a burr 7 is developed as the forward portion 46 of the buckle sleeve 16 bulbs outward and pivots around the end dome 82 of wrinkle sleeve 17. This burr serves as a cushion to prevent the blind head from tucking under. As a result of the forward buckle sleeve shoulder structure, the offset forces $F_A$ and $F_R$ of FIG. 9, and the burr development seen in FIG. 7, the buckle formation is large, of predetermined preformed configuration and contacts flat against the surface of the workpiece 34 as shown in the left-hand portion of FIG. 7. Thus, unlike the prior art including the blind rivet disclosed in my U.S. Pat. No. 4,312,613, the present invention provides a large blind head with a predefined extent of radial contact with the workpiece, while it (as discussed hereinafter) uses a buckle sleeve which can be cold formed instead of requiring one that is more expensive (in both labor and materials) because of machining requirements.

Figure 8:
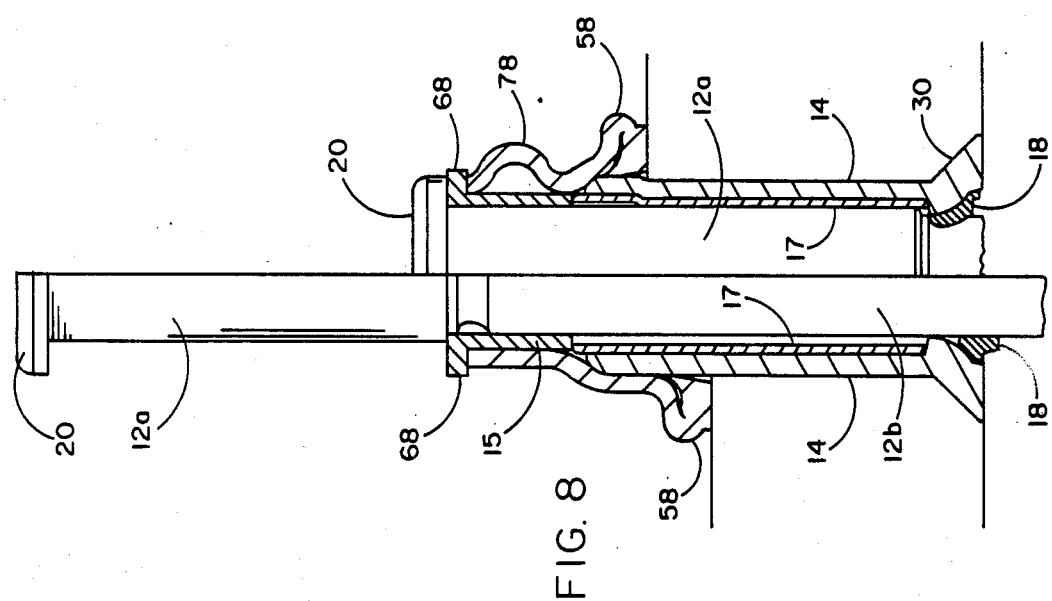
FIG. 8 is still another view illustrating two stages of pressure sleeve and wrinkle sleeve interaction.

FIG. 8 also provides a split illustration, in this instance to indicate the action of the elongated stem portion 12a of the mandrel 12. More specifically, as seen on the left side of FIG. 8, the buckle 58 has already been formed by the compression forces applied through mandrel 12 and pressure sleeve 15 on to buckle sleeve 16, before the stem head 20 has moved closer to the pressure sleeve. However, upon further pulling force being exerted on mandrel 12, the temporary restraining shoulder 13 ruptures allowing the larger diameter stem portion 12a of the mandrel pass through the pressure sleeve 15 and the wrinkle sleeve 17 including that portion of the wrinkle sleeve positioned on the blind side of the workpieces. Eventually, the stem head 20 engages the flange 68 of pressure sleeve 15 which, in turn, has previously been stopped by being in abutting relation with the rear end of wrinkle sleeve 17, terminating the relative motion between those elements of the assembly and preventing overfolding of the buckle sleeve. The diameter of mandrel portion 12a, being larger than the diameter of mandrel portion 2b and larger than the inner diameter of convolutions 19b, smooths the wrinkle sleeve 17, producing a tight, generally flow resistant interference fit not unlike the blind bolt described in my prior U.S. Pat. No. 4,089,249. However, in this instance, because a tail portion of both wrinkle sleeve 17 and rivet body 14 extend free, rearward of workpiece 34, those free tail portions expand beyond the hole in the workpiece. That measurable tail expansion is sufficient to lock the rivet body 14 to the workpiece 34 even in the unlikely event that vibration should happen to shake the stem and buckle sleeve from the joined structure. This feature constitutes a significant and patentable improvement over the blind rivet disclosed in my prior U.S. Pat. No. 4,312,612.

Figure 6:
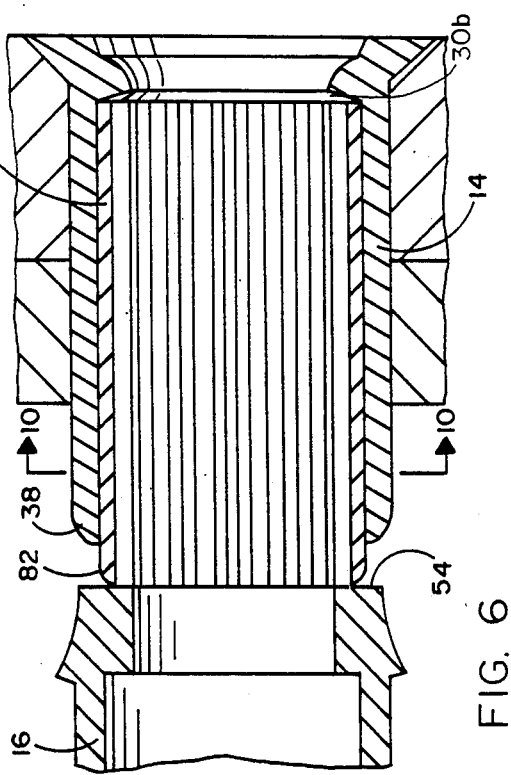
FIG. 6 shows an enlarged cross-sectional view of the buckle sleeve, the rivet body and the wrinkle sleeve.

While the stepped radius form for domes 38 and 82, shown best in FIGS. 2 and 6, is preferred, other configurations are also within the scope of the present invention. Further, it can be seen that the rivet body 14 of the present invention is made up of a two-piece construction with a deep counter bore to accommodate sleeve 17 over the substantial length of both workpieces 34 and 36. This helps achieve the desired interference fit. Alternatively, body 14 can be made with a shallow counter bore to accommodate a smaller wrinkle sleeve. In such embodiment, the wrinkle sleeve would extend into body 14 so as not to abide within the workpieces that are to be joined together. Thus, the body 14 can be configured to accept a short wrinkle sleeve that protrudes beyond the tail of the body 14 to approximate the end dome illustrated in U.S. Pat. No. 4,312,613. The wrinkle sleeve 17 may also be of a smooth wall construction with a hint of a counterbore designed to contain the front end of the buckle sleeve 16 against which it mates under installation load.

The buckle sleeve 16 shown best in FIG. 2 is a significant and patentable improvement over the prior art. Unlike the buckle sleeve shown in my prior U.S. Pat. No. 4,312,613 which has two different inside diameters, three different outside diameters and two thickened ends, the forward end thickened on the inside and the rearward end thickened on the outside, the buckle sleeve of the present invention is far simpler. More specifically, the buckle sleeve 16 has only the forward end thickened on both inside and outside with a smooth cylindrical portion rearward to facilitate piercing by a cold forming process rather than by machining and drilling. The cost savings resulting from the new inventive buckle sleeve configuration is quite significant not only in machine time, but also in material savings because higher strength expensive materials normally used for the buckle sleeve need not be machined away. Furthermore, the cold forming process is inherently more repeatable and thus more accurate than a comparable machining process.

Figure 14:
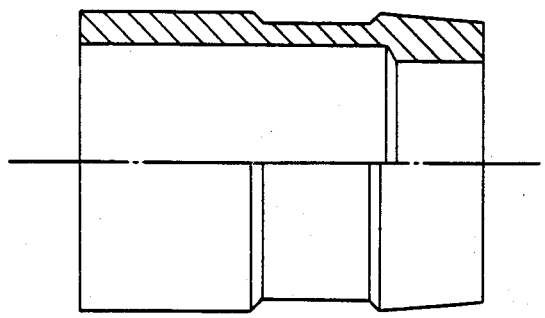
FIG. 14 is a partially cross-sectional radial view of an alternative buckle sleeve embodiment which may be used in the present invention.

FIG. 14 illustrates an alternative embodiment for the buckle sleeve. This alternative design allows for even greater blind head dimension without cracking the sleeve because of overexpansion, but is more expensive to produce. The two buckle sleeve designs disclosed herein allow for tradeoff between low cost manufacture and maximum blind head diameter.

It will now be understood that what has been disclosed herein comprises a novel improved blind rivet assembly having a number of significant and patentable advantageous features as compared to the prior art including my prior U.S. Pat. Nos. 4,089,249 and 4,312,613. Those having skill in the relevant art will now, as a result of the applicant's teaching herein, perceive various modifications and additions. By way of example, alternative specific geometrical shapes and dimensions will become apparent. However, all such modifications and additions are deemed to be within the scope of the invention which is to be limited only by the claims appended hereto.

I claim:

1. A blind rivet assembly comprising a mandrel with a flared head at one end, a rivet body and a separate buckle-forming sleeve disposed about said mandrel, and further including;
   a second, separate sleeved disposed within and extending along substantially the entire length of said rivet body, and abutting against one end of said buckle sleeve such that as said mandrel is translated through a workpiece, said second sleeve urges said rivet body to expand radially outward thereby achieving hole filling and interference fit in said workpiece; and
   wherein said second sleeve has a corrugated cross-section with corrugations running parallel to said mandrel.

2. A blind rivet assembly comprising a mandrel with a flared head at one end, a rivet body and a separate buckle-forming sleeve disposed about said mandrel, and further including:
   a second, separate sleeve disposed within and extending along substantially the entire length of said rivet body, and abutting against one end of said buckle sleeve such that as said mandrel is translated through a workpiece, said second sleeve urges said rivet body to expand radially outward thereby achieving hole filling and interference fit in said workpiece; and
   a rear end of said rivet body and said second sleeve define a double domed configuration with a first end dome extending forwardly from said second sleeve and having a minimum diameter at said rear end and a maximum diameter where the first dome terminates and a second dome on said rivet body begins, said second dome extending with increasing diameter forwardly from the termination of said first dome;
   said buckle sleeve has a central walled section and a forward end section which abuts against the first end dome of said second sleeve, the inner diameter of said central walled section being greater than the inner diameter of said forward end section so that there is an internal shoulder at the rear of said forward end section, the radial thickness of said forward end section being greater than the radial thickness of said central walled section; and
   the length of said rivet body being greater than the thickness of said workpiece, so that during installation as said mandrel is translated forwardly while counterforce is exerted axially rearwardly on said rivet body, said buckle sleeve will begin to buckle while said forward end section is still abutting against said second sleeve first dome, said buckle initially forming in the vicinity of said internal shoulder, continued mandrel translation causing said buckle sleeve to slide over said first end dome into abutment with said second dome, the increased resistance of the second dome to forward movement of said buckle sleeve resulting in continued buckle formation as said mandrel is translated further forward, so that said buckle is substantially completely formed against said second dome, further continuing forward translation of said mandrel causing said substantially fully formed buckle to expand over said second dome and to translate axially along the exterior of said rivet body into firm abutting relationship with said workpiece.

3. A blind rivet assembly according to claim 2 wherein said buckle sleeve has internal and external shoulders formed adjacent said end abutting against said second sleeve.

4. A blind rivet assembly comprising a mandrel, a two-part rivet body and a separate buckle-forming sleeve disposed about said mandrel, and wherein said two-part rivet body has a first portion which extends through an associated workpiece and a second portion which is axially disposed in said first portion and extends beyond a rear end thereof so as to abut against said buckle-forming sleeve, said two-part rivet body and said buckle-forming sleeve axially disposed on said mandrel such that as said mandrel is translated through an associated workpiece, said second portion urges said buckle-forming sleeve to buckle prior to engaging said workpieces.

5. A blind rivet assembly according to claim 4 wherein said second portion has a tubular, corrugated-like configuration with corrugations running parallel to said mandrel.

6. A blind rivet assembly according to claim 4 further including a pressure sleeve disposed within said buckle-forming sleeve and engaging a portion of said mandrel.

7. A blind rivet assembly for use in joining an associated workpiece together comprising:
   (a) mandrel with a flared head at one end;
   (b) a rivet body;
   (c) a buckle-forming sleeve, said buckle-forming sleeve and said rivet body disposed about said mandrel;
   (d) a pressure sleeve extending out of said buckle sleeve and engaging said mandrel;

(e) an expandable sleeve disposed within and extending along the length of said rivet body, and abutting against one end of said buckle sleeve, such that as said mandrel is translated through said workpiece, said second sleeve urges said rivet body to expand radially outward thereby achieving hole filling and interference fit in said workpiece; and (f) wherein said expandable sleeve has a corrugated configuration with corrugations running parallel to said mandrel.

8. A blind rivet assembly for use in joining an associated workpiece together comprising:
   (a) mandrel with a flared head at one end;
   (b) a rivet body;
   (c) a buckle-forming sleeve, said buckle-forming sleeve and said rivet body disposed about said mandrel;
   (d) a pressure sleeve extending out of said buckle sleeve and engaging said mandrel;
   (e) an expandable sleeve disposed within and extending along the length of said rivet body, and abutting against one end of said buckle sleeve, such that as said mandrel is translated through said workpiece, said second sleeve urges said rivet body to expand radially outward thereby achieving hole filling and interference fit in said workpiece; and
   (f) wherein a rear end of said rivet body and said expandable sleeve adjacent said mandrel head each have a domed configuration.

9. A blind rivet assembly for use in joining an associated workpiece together comprising:
   (a) mandrel with a flared head at one end;
   (b) a rivet body;
   (c) a buckle-forming sleeve, said buckle-forming sleeve and said rivet body disposed about said mandrel;
   (d) a pressure sleeve extending out of said buckle sleeve and engaging said mandrel;
   (e) an expandable sleeve disposed within and extending along the length of said rivet body, and abutting against one end of said buckle sleeve, such that as said mandrel is translated through said workpiece, said second sleeve urges said rivet body to expand radially outward thereby achieving hole filling and interference fit in said workpiece; and
   (f) wherein said expandable sleeve abuts against a shoulder formed on an internal wall of said rivet body.

10. A blind rivet assembly for use in joining an associated workpiece together comprising:
    (a) mandrel with a flared head at one end;
    (b) a rivet body;
    (c) a buckle-forming sleeve, said buckle-forming sleeve and said rivet body disposed about said mandrel;
    (d) a pressure sleeve extending out of said buckle sleeve and engaging said mandrel;
    (e) an expandable sleeve disposed within and extending along the length of said rivet body, and abutting against one end of said buckle sleeve, such that as said mandrel is translated through said workpiece, said second sleeve urges said rivet body to expand radially outward thereby achieving hole filling and interference fit in said workpiece; and
    (f) wherein said mandrel has a first large diameter section adjacent said enlarged head, a second small diameter portion extending through said sleeves and said rivet body and a right angle shoulder formed therebetween, said buckle sleeve initially located on said assembly between said shoulder and said wrinkle sleeve;
    (g) wherein said pressure sleeve defines a shoulder which extends over a rear end of said buckle sleeve adjacent the large diameter section of said mandrel, the shoulder of the pressure sleeve abutting against the shoulder of said mandrel.

11. A blind rivet assembly according to claim 10 wherein said pressure sleeve acts to temporarily retain said mandrel until a buckle is formed on said buckle sleeve and said buckle sleeve has translated down said rivet body to engage said workpiece, and thereafter the large diameter portion of said mandrel translates through said head sleeve and causes said expandable sleeve and said rivet body to expand radially outwardly thereby achieving interference fit in said workpiece.

12. A blind rivet assembly according to claim 7 wherein said expandable sleeve is a corrugated thin-walled regular cylinder.

13. A blind rivet assembly for use in joining an associated workpiece together comprising:
    (a) mandrel with a flared head at one end;
    (b) a rivet body;
    (c) a buckle-forming sleeve, said buckle-forming sleeve and said rivet body disposed about said mandrel;
    (d) a pressure sleeve extending out of said buckle sleeve and engaging said mandrel;
    (e) an expandable sleeve disposed within and extending along the length of said rivet body, and abutting against one end of said buckle sleeve, such that as said mandrel is translated through said workpiece, said second sleeve urges said rivet body to expand radially outward thereby achieving hole filling and interference fit in said workpiece; and
    (f) wherein said buckle-forming sleeve comprises a generally hollow cylindrical configuration having a thickened forward end, the rearwardly directed portion of said cylinder behind said thickened end being of uniform thickness to facilitate fabrication by a cold-forming process.

14. A blind rivet assembly for use in joining an associated workpiece together comprising:
    (a) mandrel with a flared head at one end;
    (b) a rivet body;
    (c) a buckle-forming sleeve, said buckle-forming sleeve and said rivet body disposed about said mandrel;
    (d) a pressure sleeve extending out of said buckle sleeve and engaging said mandrel;
    (e) an expandable sleeve disposed within and extending along the length of said rivet body, and abutting against one end of said buckle sleeve, such that as said mandrel is translated through said workpiece, said second sleeve urges said rivet body to expand radially outward thereby achieving hole filling and interference fit in said workpiece; and
    (f) wherein upon translation of said mandrel through said workpiece, said pressure sleeve abuts said expandable sleeve to prevent over-folding of said buckle sleeve.

* * * * *